(12) United States Patent
Mauger et al.

(10) Patent No.: US 6,298,043 B1
(45) Date of Patent: Oct. 2, 2001

(54) COMMUNICATION SYSTEM ARCHITECTURE AND A CONNECTION VERIFICATION MECHANISM THEREFOR

(75) Inventors: Roy Harold Mauger, Hertfordshire; Julian Frank Barry Cable, Herts; Simon Daniel Brueckheimer, London, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/049,702

(22) Filed: Mar. 28, 1998

(51) Int. Cl.[7] .................................................. H04J 1/16
(52) U.S. Cl. ........................ 370/248; 370/244; 370/254; 370/395; 370/230
(58) Field of Search ................................. 370/351, 352, 370/354, 353, 355, 356, 357, 358, 359, 360, 376, 386, 387, 388, 389, 391, 394, 395, 400, 411, 412, 419, 422, 427, 428, 431, 464, 908, 912, 914, 915, 916, 212, 229, 254, 276, 248, 230

(56) References Cited

U.S. PATENT DOCUMENTS

| | | | |
|---|---|---|---|
| 4,996,685 | * | 2/1991 | Farese et al. .......................... 370/352 |
| 5,548,587 | * | 8/1996 | Bailey et al. .......................... 370/395 |
| 5,790,548 | * | 8/1998 | Sistanizadeh et al. ................ 370/401 |
| 6,061,363 | * | 5/2000 | Evans et al. .......................... 370/467 |

* cited by examiner

Primary Examiner—David R. Vincent
(74) Attorney, Agent, or Firm—Lee, Mann, Smith, McWilliams, Sweeney and Ohlson

(57) ABSTRACT

A communication system typically comprises a number of interconnected broadband-narrowband interfaces (304, 402–404) that together interact to provide a communication resource (400) that can support a call across the system At a time when the communication resource (or a portion thereof) is apparently in place, a terminating node of a broadband-narrowband interface sends a verify-request message (452) backwards across the communication resource. A connection broker (322), coupled to both ends of the communication resource in a particular broadband-narrowband interface (404), is aware of the issuance of the verify-request message, and is therefore able to assess and report, principally, on path connectivity of the communication resource (either within the broadband-narrowband interface or between adjacent interfaces). More particularly, the connection broker expects the arrival of a path connectivity message (454, 460) issued from an end of the broadband-narrowband network responsive to the verify-request message and, as such, can provide an appropriate report (458, 470, 480) upon the timely receipt, or not, of the path connectivity message. Indeed, the verify-request message may also function to confirm path continuity.

30 Claims, 6 Drawing Sheets

COMMUNICATION SYSTEM ARCHITECTURE AND A CONNECTION VERIFICATION MECHANISM THEREFOR

RELATED PATENT APPLICATIONS

The present application is related to: i) co-pending U.S. patent application Ser. No. 08/907,521 [Applicant's reference FPUS97518/ID0722] filed on Aug. 8, 1997 in the name of J. F. B. Cable et al. and assigned to Northern Telecom Limited, which co-pending U.S. patent application is further identified by its title "SYSTEM AND METHOD FOR ESTABLISHING A COMMUNICATION CONNECTIONS"; and ii) co-pending UK patent application number 9720920.9 [Applicant's reference PUK97674/ID0835] filed on Oct. 1, 1997 in the name Northern Telecom Limited, which co-pending UK patent application is further identified by its title "COMMUNICATION SYSTEM ARCHITECTURE AND OPERATING METHODS THEREOF" and the first named inventor R. H. Mauger.

BACKGROUND TO THE INVENTION

This invention relates, in general, to a communication system architecture and a connection verification mechanism therefore, and is particularly, but not exclusively, applicable to a network and mechanism that can confirm that connections have been established and are maintained correctly end-to-end across the network for the duration of a call. The invention has application in combination networks that integrate narrowband call structures with broadband functionality, although the invention is equally applicable to isolated narrowband or isolated broadband system.

SUMMARY OF THE PRIOR ART

Globally, telecommunication systems are, generally, in a transitional phase between second generation, narrowband digital networks (such as the Global System for Mobile (GSM) cellular communication system) and future, multimedia digital networks (such as the Universal Mobile Telecommunication System (UMTS)) having broadband capabilities. Indeed, radio frequency (RF) and wireline systems are being merged together to enhance the information transfer mechanism, while still providing some flexibility with respect to mobility within the network. For example, broadband (typically fiber-optic based) infrastructure connections are being utilised to support information (both voice and data) transfer between cellular RF coverage areas. The transition to broadband systems is, in fact, necessarily required to support higher data rate communications, including video and Internet applications that are presently being both considered and made available to subscribers to the service. Unfortunately, this transitional phase also presents system operators with several dilemmas, and prejudices immediate implementation of such broadband systems. For example, until such a time when a freestanding broadband system becomes an accepted and freely available standard for all subscriber terminals (such as cellular telephones and data transmission devices), system operators are reticent to write-off their significant investments in current narrowband infrastructure technology. Indeed, such narrowband infrastructure technology already provides a rich set of services and service creation environments that would have to be reimplemented for deployment in broadband networks. Consequently, present-day narrowband systems must be adapted to accommodate both narrowband and broadband users; with this statement particularly relevant to service and system management, call establishment and inter-working procedures between these different forms of network.

For an effective migration between narrowband and broadband systems (for the transitional phase), system operators must particularly consider an inter-working scenario when all subscribers connect to a narrowband network, but one or more intermediate broadband networks are used to relay information between these narrowband subscribers. Any interim solution should also optimise service and system management, while also providing infrastructure equipment that can be re-used in a fully-fledged broadband environment. In more detail, telecommunication networks comprise nodes connected by communication resources (usually termed "links"), with a particular network technology characterised by the means of transmission of user and control information along these links and also by the routing and relaying functions embodied in the nodes. The term routing is used to describe the process of determining the path the information will take through the network, while relaying is the process of transferring information from one link to another, i.e. the information is merely passed, without alteration, from one channel resource to another. Routing and relaying functions are therefore core to the development of an efficient system having optimised service capabilities, with operator profits and subscriber service charges inherently entwined with such optimisation.

Taking GSM as an exemplary form of a narrowband digital network, user and control information (or "data") is interleaved, using time division multiplexing (TDM), on a 64 kbit per second (kbps) pulse code modulated (PCM) bearer channel. More especially, the sixty-four kbps bearer channels, typically encoded with a pulse code modulation, are communicated between the base station sub-system (BSS) and the mobile service switching center (MSC) over an E1 link. Indeed, each bearer channel can be framed to support four voice calls of sixteen kbps comprised from thirteen kbps of sampled and encoded speech and three kbps of ancillary information, such as parity check and correction bits (and the like) and synchronisation information. Data is then relayed across a node by some form of synchronous TDM switching fabric, often of the "time-space-time" type, although other fabric arrangements are equally applicable. Control information (e.g. call set-up and tear-down messages) logically follows the same path (although not always the same physical path) through the network as user information and is terminated in each node for routing purposes. Routing is conventionally performed in each node on a "hop-by-hop" basis using long lived routing tables, i.e. the node is sufficiently intelligent to determine an optimum route of the succeeding connection.

Control information is regulated by a signalling scheme that is distinctive to the type of network employed. Particularly, public signalling systems are used between nodes of a public network and between public networks of different operators. Signalling System No. 7 is the only important example of a public signalling system. Access signalling systems are used between subscribers and edge nodes of public networks, e.g. between a radiotelephone and a base station subsystem (BSS). in fact, the most common digital access signalling schemes are Common Channel Signalling Systems, such as the Integrated Service Digital Network (ISDN) DSS1 signalling schemes (and its predecessors) and Channel Associated Signalling schemes that are both derived from analog signalling. Private schemes are generally derived from access schemes but provide richer functionality within personal networks, such as within a secure private branch exchange (PBX).

On the other hand, broadband digital networks are characterised in that user and control information is transmitted in fixed or variable length "packets" or "cells", with these packets prepended with headers that contain bearer channel identification. In contrast with narrowband systems, user information is relayed across a node via an asynchronous switching fabric that examines each packet in turn (using some kind of fairness algorithm) and directs it to the appropriate output link in response to the input link and bearer channel identification. Routing and control information transmission is, however, similar to that for the narrowband case, and differs only inasmuch as the signalling schemes are technology specific.

Another significant problem associated with prior art narrowband-broadband interfaces arises with architectural change. For example, the introduction of new or up-graded infrastructure can have unwanted ramifications throughout the entire communication system because changes in the inter-working relationships between the network controller (e.g. a call server) and the narrowband-broadband interface can potentially alter network identities and addresses. More particularly, the configuration of the narrowband-broadband interface may change (as a result of either the inclusion of additional equipment, the up-grading of existing equipment, or the failure of a particular system entity), while the call server remains oblivious to this change because of the uniform fabric application interface between the call server and the fabric control software. Consequently, the system (generally) may not necessarily be exploited and optimised to its greatest potential. Network providers may therefore also be discouraged from implementing the further development of existing networks since global system changes may be required, with such system changes being both time consuming and complex in nature.

To facilitate use of broadband networks and the migration of communication networks to high data rate technologies (e.g. the 2 Mbps rate envisaged within UMTS), there is a need to provide an effective mechanism for interconnecting narrowband networks through a transparent broadband ether, while also providing an easy migration to more advanced systems. Moreover, to encourage subscription to broadband services, operators must provide a reliable but relatively loweost (and hence optimised) communication system architecture. Furthermore, the broadband ether must accommodate and support narrowband signalling schemes without effecting either data integrity or in any way inhibiting data flow or interconnection. Indeed, since a call is likely to be routed over many interconnected networks or different sections of a network, it is clearly desirable (with respect to the provision of a robust and guaranteed service and the management of a network, generally) for the communication system to possess a mechanism that can ensure that all the links have been successfully realised to support end-to-end data transmissions. Specifically, from both a network operator and subscriber view-point, it is optimal to have the entire path established before transmission begins, rather than having each leg of the connection determined 'on-the-fly' (with this particularly critical to voice communication). In this respect, some form of link verification mechanism is required, which verification mechanism should be applicable to mixed node communication systems and which mechanism should also be able to determine and identify failed routes prior to the transmission of data.

SUMMARY OF THE INVENTION

According to a first aspect of the present invention there is provided a method of verifying the path connectivity of a communication resource that supports a call between a first node and second node, the call established through a connection broker located intermediate between a call server responsible for controlling the call and a switch assembly that routes the call, and wherein the second node is separated from first node by at least one switch assembly, the method comprising the steps of: causing the connection broker to be aware of a requirement to confirm the path connectivity of a connection between the first node and the second node; sending, over the communication resource for the call, a path verify-request message between the first node and the second node; detecting the path verify-request message at a respective node to which the path verify-request message was sent; at the respective node to which the path verify-request message was sent, sending the connection broker a verify-confirm message indicating receipt of the path verify-request message over the communication resource for the call; and at the connection broker, receiving the verify-confirm message else causing the connection broker to register a fault in the communication resource for the call.

In a preferred embodiment, the second node is a network adaptor that interfaces a broadband resource to a narrowband trunk, and the step of causing the connection broker to be aware of the requirement to confirm further includes the steps of: having the connection broker notify the network adaptor of the requirement to send the path verify-request message.

At a connection broker and in response to receiving the verify-confirm message, a preferred embodiment sends an end-to-end confirmation message to a connection broker associated with the node from which the path verify-request message originated, with the end-to-end confirmation message verifying at least the path connectivity of the communication resource for the call.

The path verify-request message may also be used to assess path integrity and path quality, while digital signatures may be included within the message to avoid erroneous behaviour or interpretation by, or malicious interference to, an ATMS.

In the event that the end-to-end confirmation message is not received within a predetermined time, a path disruption message is sent to the call server such as to cause tear-down and re-routing of the call.

Each node in the connection is arranged to modify the path-verify request message to include node-specific connectivity information, whereby information to a selected path is distributed to the connection brokers of the system. Any connection broker can then initiate path tear-down.

In another aspect of the present invention there is provided a communication system comprising at least one call server responsible for controlling a call supported by a communication resource between a first node and a second node, a plurality of interconnected switch assemblies responsive to the at least one call server and arranged to provide routes for the communication resource, and a plurality of connection brokers each coupled between the at least one call server and each of the plurality of interconnected switch assemblies, the system further comprising: means for causing a connection broker to be aware of a requirement to confirm the path connectivity of a connection between the first node and the second node; means for sending, over the communication resource assigned to the call, a path verify-request message between the first node and the second node; means for detecting the path verify-request message at a respective node to which the path verify-request message was sent; in the respective node to which the path verify-request message was sent, means for sending the connection broker a verify-confirm message indicating receipt of the path verify-request message over the communication resource for the call; and in each connection broker, means for receiving the verify-confirm message to confirm path connectivity of the communication resource between the first node and the second node else means for causing the connection broker to register a fault in the communication resource assigned to the call.

In a further aspect of the present invention there is provided a connection broker for coupling between a call server and a switch assembly having a first node and a second node and wherein the call server is arranged to control a call supported by a communication resource established between the first node and the second node, the connection broker comprising: means for receiving a path verify-request message emanating from the second node, which path verify-request causes the connection broker to anticipate receipt of a verify-confirm message sent from the first node; means for registering a verify-confirm message to confirm at least path connectivity of the communication resource between the first node and the second node; and means for causing the connection broker to register a fault in the communication resource assigned to the call in the event that the means for registering fails to detect the verify-confirm message.

Preferably, the connection broker further includes means for both sending and receiving an end-to-end confirmation message, and means responsive to the receipt of the end-to-end confirmation message for substantiating path integrity of the communication resource to the call server.

Advantageously, the present invention provides a communication system architecture that can operate across mixed nodes having both narrowband and broadband capabilities or across interconnected circuits of a single communication node to provide an indication of communication link connectivity, i.e. a verification that an end-to-end through-path has been established. For example, the through-path might be from a calling party or a network adaptor of an interface to a called party (such as another subscriber terminal or an intelligent peripheral, e.g. an Internet server). Indeed, the present invention can, if desired, operate in-call and throughout the duration of the call.

The present invention is further able to identify (and report) specific link failures to a management agent within the architecture of the communication network, which management agent is therefore able to instruct a call server to reconfigure the system to take into account the failure.

By using F-5 cells (or the like) to support the verification process, the present invention, beneficially, can be implemented without the need of having to introduce additional messaging formats into existing communication protocols, with the F-5 cells therefore only being used in a different context to that originally perceived by standards bodies. Furthermore, use of F-5 cells also allows path quality to be assessed, while receipt of information within the F-5 cells can also be used to assess path continuity.

BRIEF DESCRIPTION OF THE DRAWINGS

An exemplary embodiment of the present invention will now be described with reference to the accompanying drawings, in which.

DETAILED DESCRIPTION OF THE PREFERRED EMBODIMENT

Figure 1:
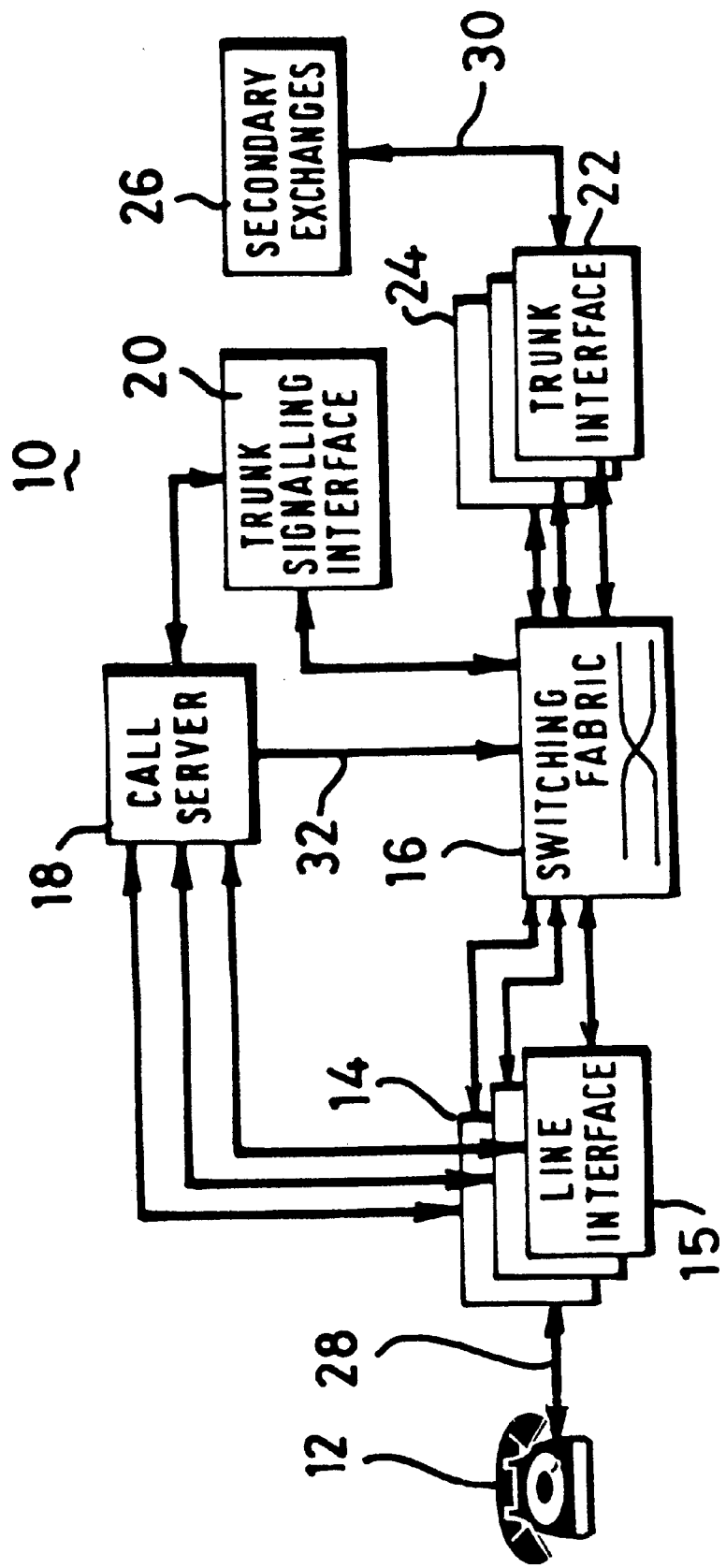
FIG. 1 is a block diagram illustrating an abstract model of a narrowband communication node.

Referring to FIG. 1, a block diagram illustrating an abstract model of a narrowband communication node 10 is shown. A number of subscriber terminals 12, such as land-line telephones or modems, are coupled, typically, to a plurality of line interfaces 14–15 (although only one need be supplied for an operational system). The plurality of line interfaces 14–15 are each connected to a switching fabric 16 that is arranged to route an input of the switching fabric 16 to an appropriate output thereof, as will readily be appreciated. The plurality of line interfaces 14–15 are also coupled (usually on an individual basis) to a call server 18 arranged to administer and control, for example, the set-up and tear-down of calls across the narrowband network 10. The call server 18 is further coupled to the switching fabric 16. A trunk signalling interface 20, that acts to decode and interpret signalling schemes used within the narrowband network 10, is coupled between the call server 18 and the switching fabric 16. Outputs from the switching fabric 16 are coupled to a plurality of trunk interfaces 22–24 (although only one need be supplied for an operational system). The plurality of trunk interfaces is further coupled to secondary exchanges 26, such as PBXs or BSSs, within the narrowband network 10.

As will be appreciated, the term "subscriber terminal" is used merely to describe a particular endpoint connection for a line or trunk interface.

User information (traffic) 28–30 enters the narrowband infrastructure via line interfaces 14–15 or trunk interfaces 22–24. Control information from individual subscribers enters via the line interfaces 14–15, whereas control information, i.e. inter-node signalling, from connected trunked networks (e.g. the secondary exchanges 26) can enter either via the same trunks as the traffic 30 or through the use of dedicated channel resources (not shown). The call server 18 processes incoming call requests and selects an appropriate outgoing trunk or line, as will readily be appreciated. More particularly, the call server 18 (through the switching fabric 16) controls the connection of specific lines to specific trunks across through the use of fabric control messages 32 that specify the making and breaking of connections between subscriber terminals 12.

While most calls in narrowband systems are two-way, it is helpful to introduce, at this time, the nomenclature associated with one-way connections, namely the connection (TA, TB) refers to the one-way connection from terminal TA to terminal TB while (TB, TA) refers to a complementary (or independent supported) connection in the reverse direction.

Figure 2:
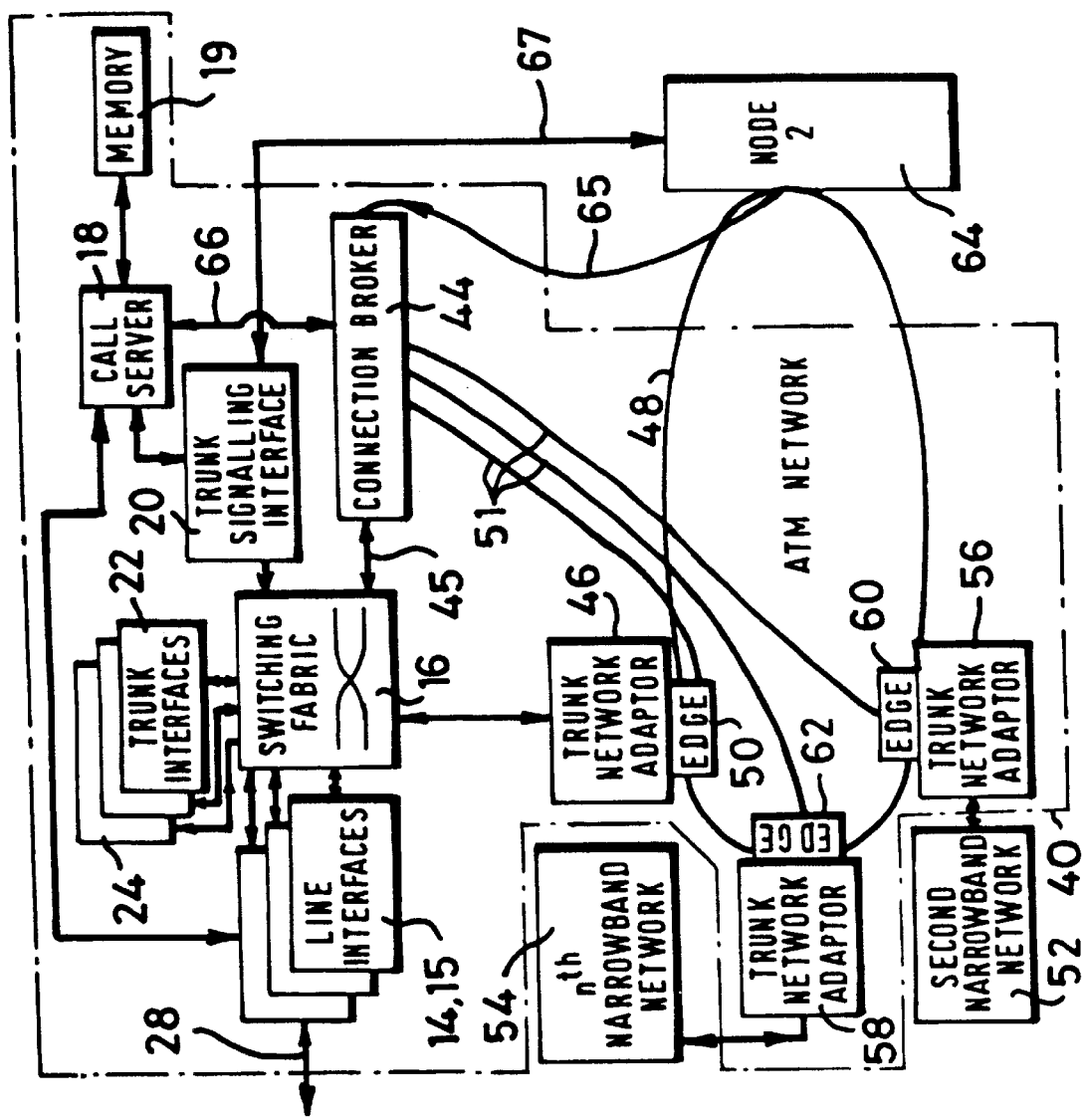
FIG. 2 is a block diagram illustrating an underlying principle for subscriber terminal interconnection between narrowband and broadband networks, as required in the present invention.

Turning now to FIG. 2, there is shown a block diagram illustrating an underlying principle for subscriber terminal interconnection between narrowband and broadband networks, as required in the present invention. In this figure, a broadband network is used to transport the user and/or control information. To facilitate an understanding of the architectural differences between the conventional narrowband network of FIG. 1 and the broadband network adjunct that interconnects narrowband networks, common infrastructure is labelled with identical reference numerals.

At a first node 40, a number of subscriber terminals, such as landline telephones or modems (not shown for the sake of clarity), are coupled, typically, to a plurality of line interfaces 14–15 (although only one need be supplied for an operational system) of a narrowband system. The plurality of line interfaces 14–15 are each connected to a switching fabric 16 that is arranged to route an input of the switching fabric 16 to an appropriate output thereof. The plurality of line interfaces 14–15 are also coupled (usually on an individual basis) to a call server 18 arranged to administer and control, for example, the set-up and tear-down of calls across the narrowband network. The call server is coupled to a memory that is arranged to store, amongst other things, circuit indicators codes (CICs) associated with both real trunks and "phantom trunks"; the purpose of the latter will be described subsequently. More particularly, the memory can record a "busy" or "vacant" status against each of these real or phantom trunks. The call server 18 is further coupled to a connection broker 44, which in turn is coupled to the switching fabric 16 via bus 45. The connection broker 44 represents a first departure in the system architecture of the present invention from the conventional narrowband network FIG. 1. A trunk signalling interface 20, arranged to act to decode and interpret signalling schemes used within the narrowband network, is coupled between the call server 18 and the switching fabric 16. Outputs from the switching fabric 16 are coupled to a plurality of trunk interfaces 22–24, (although only one need be supplied for an operational system. The plurality of trunk interfaces are again coupled to secondary exchanges (not shown for the sake of clarity), such as PBXs or BSSs, within the narrowband network.

The switching fabric 16 is further coupled to a first trunk network adaptor 46 that allows interconnection and interoperability of the narrowband network with a broadband network 48 implemented, for example, for asynchronous transmission mode (ATM) operation. More particularly, interconnection of the trunk network adaptor 46 is through a broadband network edge switch 50, that is coupled to and hence controlled by the connection broker 44 by control lines (or buses) 51. The combined function of the trunk network adaptor 46 and the broadband network edge switch 50 will be described subsequently. Other narrowband networks 52–54 are coupled, in a similar fashion, to the broadband network 48 via respective trunk network adaptors 56–58 and broadband network edge switches 60–42. As will be appreciated, other narrowband networks 52–54 will be realised through infrastructure architectures similar to that described immediately above.

The broadband network 48 is further coupled to a second node 64, typically a different network, which is also responsive to the connection broker 44 via connection (or control line or control bus) 65. The second node 64 is also arranged to be in communication with the trunk signalling interface 20 via communications bus 67. Additionally, as will be understood, the broadband network may support point-to-point broadband communications, such as video telephony between subscriber terminals (not shown).

As will be appreciated, the terms node and exchange are interchangeable and are used to describe stand-alone networks, e.g. distinct narrowband networks operated by different operators.

Narrowband signalling within the communication system, generally, is controlled by the call server 18, while broadband signalling, i.e. signalling that may be sent between different narrowband networks 52–54 via the intermediate broadband network 48, is controlled by the connection broker 44. Consequently, the call server 18 is not concerned with broadband signalling interconnection and operation.

The narrowband line interfaces 14–15, trunk interfaces 22–24 and switching fabric 16 are supplemented by a broadband network 48 and trunk (i.e. narrowband-broadband) network adaptors 46, 56–58 that act to provide gateway functionality. Specifically, the trunk network adaptors 46, 56–58 perform traffic (user information) interworking functions and signalling (control information) encapsulation, with the signalling ultimately relayed back to a call server 18.

The function performed by the connection broker 44 is used to provide a uniform connection abstraction 66 for the call server 18, independent of whether the connection crosses (and is retained entirely within) the narrowband network or the broadband network, or in the case where the connection crosses both the narrowband and broadband networks. This necessitates use of a uniform terminal name space identity (i.e. a standardised address format) for all terminals across the entire communication system, i.e. both narrowband and broadband systems.

For a narrowband to narrowband connection in a single narrowband network (e.g. owned by a particular operator), the connection broker 44 passes the connection messages to the switching fabric 16 (via connection 45), and therefore acts transparently in order to appear identical in function to the prior art narrowband network of FIG. 1. The switching fabric 16 of the narrowband network then establishes the connection in accordance with known techniques, and does not utilise the broadband network 48. For a broadband to broadband connection, the connection broker 44 instructs the broadband network and or trunk network adaptors 46, 56–58 to make or break a call connection, and therefore mimics standard broadband operation.

For a narrowband to broadband connection, however, both actions must be performed contemporaneously. Specifically, the connection broker 44 both instructs the switching fabric 16, through the call server 18 in the narrowband network, to hold open a routing path for a call and negotiates with a trunk network adaptor 46 of the broadband network for the allocation of a suitable channel resource. Once both paths have been determined, the connection broker 44 sends dedicated messages to the switching fabric 16 and the trunk network adaptor 46 to establish the connection. This achieves the connection abstraction as seen by the call server.

In an operational communication system, compatibility between operators is desirable, if not essential. As such, establishing an interconnection (usually termed a "gateway"), between different "mixed nodes" is a significant issue. In this context, the term "mixed nodes" is used to describe different networks, operated by different operators, each typically having switchable narrowband-broadband capabilities and defined service capabilities. However, intermediate broadband networks may not be able to support these services (or any service of similar nature) nor be able to interpret narrowband control channel signalling required to set-up defined narrowband services, i.e. there are different signalling protocols between the different adjacent exchanges. In this case, the interconnection of the narrowband networks (through the intermediate broadband network 48) requires the functional co-ordination of separate call servers and connection brokers located in the respective networks.

Figure 3:
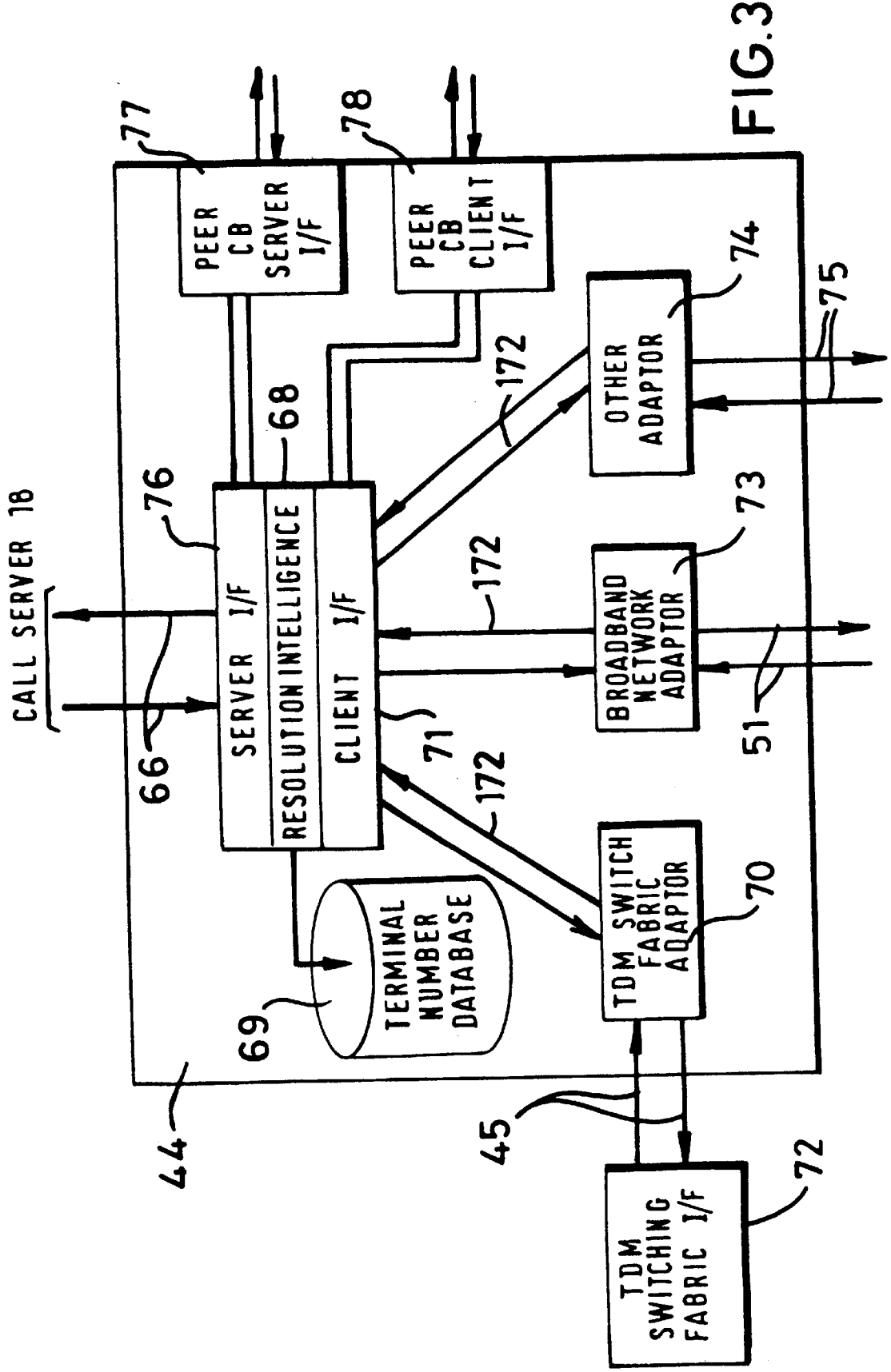
FIG. 3 illustrates an abstract architecture for a connection broker of FIG. 2.

Turning to FIG. 3, an abstract architecture for the connection broker 44 of FIG. 2 is shown. Although a hardware implementation is dependent upon (and hence determined by) specific requirements, a typical implementation extends the capabilities of an existing, narrowband telephone exchange. By way of example and explanation only, the connection broker 44 of FIG. 3 contains resolution intelligence 68 that is typically realised by a control processor. The function of the resolution intelligence 68 will be described subsequently. A terminal number data base 69 that maps the uniform terminal numbers onto network-specific location addresses is coupled to the resolution intelligence 68. A time division multiplexed (TDM) switch fabric adaptor 70 (in the case of a TDM narrowband system) provides protocol conversion between the resolution intelligence 68 (via a client orientated interface port 71) and a TDM switching fabric interface 72 (analogous to the switching fabric 16 of FIG. 2). Typically, a dedicated connection protocol 172 is utilised between the resolution intelligence 68 and the TDM switching fabric adaptor 70, although this need not be the case. A broadband network adaptor 73 is also coupled through the client interface port 71 to the resolution intelligence 68, with communication between the resolution intelligence 68 and broadband network adaptor 73 typically based on the dedicated connection protocol 172. The broadband network adaptor is analogous to the trunk network adaptor 46 of FIG. 2. Other adaptors 74 for ancillary networks or services may also be coupled to the resolution intelligence 68 via the client interface 71. The broadband network adaptor 73 and the other adaptors 74 will accordingly be respectively coupled to the broadband network edge switch 50 via control lines 51 or appropriate communication resources 75. The resolution intelligence is also coupled to a server interface port 76 that provides an interconnection facility, via lines 66, to call server 18. The server interface port is also coupled through a secondary port 77 (termed a "peer connection broker server interface") arranged to interconnect the resolution intelligence 68 of the connection broker 44 to another connection broker (shown in FIG. 4). Similarly, the client interface port 71 is also coupled to a ternary port 78 (termed a "peer connection broker client interface") arranged to couple the resolution intelligence 68 of the connection broker 44 to a subscriber terminal principally connected to another connection broker (as shown in FIG. 4).

Prior art telephone exchanges typically have a distributed processing architecture with multiple fault-tolerant processors and an inter-processor communications facility, while the switching fabric may be supported by a special purpose processor, as will be understood.

The connection broker 44 of FIG. 3 supports a set of real-time processes within a single fault tolerant processor, i.e. within the resolution intelligence 68. The inter-processor communications facility (supported by the dedicated connection protocols 172) of the connection broker is used to communicate with the switching fabric 16 and the call server 18. As has been previously described, the connection broker 44 typically incorporates broadband interfaces to enable control of the broadband network, although the connection broker may use the inter-processor communications facility to access the broadband interfaces on the trunk network adaptors. However, as communication networks evolve to be more broadband-orientated, the call server 18 and connection broker 44 may reside on processors with only broadband interfaces that are connected directly to the broadband network 48. The narrowband connection fabric would then be provided with a broadband control interface.

Figure 4:
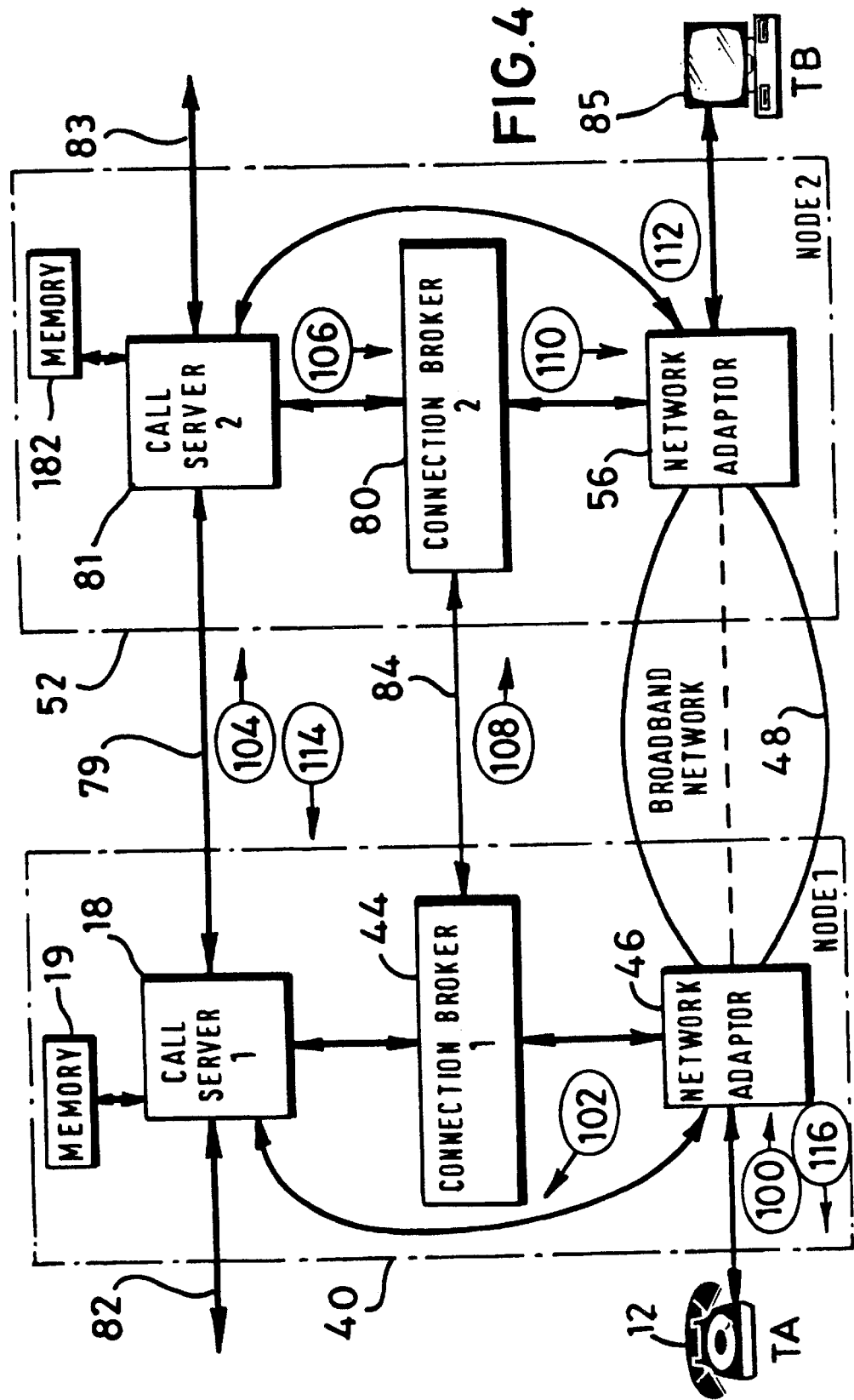
FIG. 4 is a representation of a system architecture and associated mechanism by which subscriber terminals can be connected across an intermediate broadband network.

A system architecture and associated mechanism for connecting subscriber terminals across an intermediate broadband network is shown in FIG. 4. In order for a data call, for example, to be supported between terminal TA (e.g. a land line telephone identified by reference numeral 12) on a first node 40 and terminal TB (e.g. a modem within a computer, identified by reference numeral 85) on second node 52, an existing common signalling relation between both narrowband nodes is utilised. It is the establishment of a common narrowband signalling link (or resource) 79 and protocol that provides interconnection across the system since the broadband network need only have the capability of relaying traffic between the narrowband networks. The broadband network consequently appears as a transparent channel resource since no modification of the narrowband traffic is required.

The first node 40 and the second node 52 both contain trunk network adaptors 46 and 56, connection brokers 44 and 80, and call servers 18 and 81 which are coupled permanently together over the common narrowband signalling link 79 that provides a plurality of virtual (or "phantom") traffic trunks. The call servers 18 and 81 are therefore potentially connected to other call servers (not shown) of different narrowband networks (not shown) by additional signalling resources 82–83. The call servers 18 and 81 are respectively coupled to connection brokers 44 and 80 that in turn are coupled to respective trunk network adaptors 46 and 56. The trunk network adaptors 46 and 56 are coupled together through a broadband network 48, while the connection brokers 44 and 80 are interconnected by a virtual link 84. Terminal TA 12 is coupled to trunk network adaptor 46, while terminal TB 85 is coupled to trunk network adaptor 56.

The signalling link 79 is realised by a permanent connection between the two call servers 18 and 81, although this connection may be dynamically assigned or provided by a radio frequency link. Indeed, in a scenario where the first node 40 and second node 52 pre-exist as narrowband gateway nodes between network A and network B, real narrowband E1 trunks already exist between these two exchanges and, as such, signalling can be carried in a time-slot of these E1 trunks, i.e. conventionally in time-slot sixteen. Alternatively, in a North American-based system, the two different exchanges could be connected to a common STP network. Once the broadband network 48 is in place, however, supplementary signalling bandwidth can be supported by establishing links through the broadband network. Nonetheless, these multiple paths represent a single logical "signalling relation" by which SS7 user parts (i.e. the call servers) are able to communicate and interact.

The virtual link 84 established between the two connection brokers 44 and 80 offers a permanent "ability to communicate". The virtual link 84 therefore takes the form of an ATM virtual channel connection. However, it is also possible for an SS7 network to be used as the bearer for this communication, e.g. in relation to a TCAP application. The communication links between the connection brokers 44 and 80 and both the network adaptors 46, 56 and the switching fabrics are also permanent, while connections that carry traffic between the network adaptors 46, 56 and the interconnected subscriber terminals TA 12, 85 are made and broken for the duration of a specific call or for particular portions of those calls.

This system operates by virtue of the provision of at least two (and probably tens to thousands of) assignable signalling channel resources or "phantom trunks" between the respective switching fabrics, principally residing between the respective call servers 18 and 81 and respective connection brokers 44 and 80. The nodes then utilise narrowband signalling to simulate the presence of virtual (or "phantom") terminals at either node. These phantom trunks are dedicated to a single node and, as such, the system only allows the formation of a call in one direction from the first node 40 to the second node 52 or vice versa. Thus, a phantom route between the two nodes consists of two groups of phantom trunks, one in each direction. By this mechanism, undesirable effects which could otherwise occur if the same phantom trunk was seized by each node trunk are prevented. Beneficially, the phantom trunks do not tie up real communication resources that exist between the respective narrowband networks.

In relation to the structure, content and function of call set-up messages between different exchanges (i.e. different nodes), this can best be understood with reference to FIG. 4 (and the following description) that illustrates the procedural steps required to establish a multi-node communication across a broadband network.

An incoming call (or "initial address message", IAM) from terminal TA is received at the first node 40, whose call server 18 receives the incoming message and determines that the call must be routed to the second node 52. The incoming call will at least contain a CIC relating to the trunk assigned between TA and the call server 18 together with a telephone number of the called party, namely TB in this example. The telephone number does not otherwise provide any indication of a port address to be used by TB in any subsequent communication and therefore principally acts to provide a routing instruction for use by the call servers. As such, the telephone number merely represents an address location of TB, although it may need to be subsequently transposed in order to arrive at a valid cross-node address.

In response to receipt of the incoming call and to save real communication resources (i.e. real communication links that can support 64 kbps speech, for example), the first call server 18 selects a free phantom terminal PTx and then uses this phantom terminal to establish a phantom trunk between itself and a second call server 81 located in second node 52. Indeed, the call server 18 selects an available, node-unique ("disjoint") address field indicative of the free phantom terminal PTx from its associated memory 19. The free phantom terminal PTx, in fact, identifies a terminating address of the phantom trunk.

Typically, a phantom terminal identity is comprised from point codes associated with the two call servers 18, 81 and the CIC of the phantom trunk. In this instance, ordering of the point codes of the two call servers will identify a relative direction for the communication.

The first call server 18 then utilises the phantom trunk to relay a modified call message (to the second call server 81 of the second node 52) comprised from a CIC associated with the phantom trunk together with the valid telephone number of TB. The second call server 81 is therefore able to utilise the telephone number of TB to "wake-up" or alert TB to the fact that there is something in the communication system that will be of interest to TB, albeit that TB is yet to receive any meaningful information. Unfortunately, at this time, the CIC pertaining to the connection between TA and the first call server 18 has been "lost" to the second node 52 since it is neither communicated nor encoded within the modified call message. In other words, the call server 18 of the first node 40 notifies the call server 81 of the second node 52 about the incoming call 100 by sending 104 a modified incoming call message on a phantom trunk, and thus passes on the dialled digits (i.e. the address of the called party) received from TA.

Furthermore, in response to the incoming call 100, the connection broker 44 of the first node 40 is arranged to establish a phantom cross-office path between PTx and TA, with information pertaining to this cross-office path typically stored in the terminal number data base 69 by the resolution intelligence 68. In other words, terminal TA is coupled to phantom terminal PTx. Also, the first connection broker 44 is triggered into action by the communication of the modified call message (to the second call server 81). Specifically, substantially contemporaneously with the sending of the modified call message, the first connection broker 44 of the first node 40 gnotes that the phantom terminal PTx is one end of an outgoing phantom trunk to the second node 52. The first connection broker therefore passes a connection request 108 to the second connection broker 80 via virtual link 84, which connection request contains the CIC of the phantom trunk and the identity of TA (possibly derived from the original CIC assigned to the trunk between TA and the first call server 18). Typically, the actual address of the call-originating unit, i.e. TA, is sent.

The second node 52 reacts to the modified incoming call message (received on the phantom trunk) by mapping the received circuit indicator code (CIC) of the phantom trunk onto an associated second phantom terminal PTy. Again, the second phantom terminal PTy has been selected by the second call server 81 of the second node 52 from its associated memory 182, with the memory up-dated to record that PTy represents a terminating point of the phantom trunk. Selection of the phantom terminal PTy is on a unique basis.

The second node 52, in response to the second call server 81 receiving the modified incoming call message, already appreciates that the destination of the incoming call ultimately lies with terminal TB. Therefore, at an appropriate time, the second call server 81 requests a connection from TB to the second phantom terminal PTy (in the form of a second phantom cross-office path request between the phantom trunk and the called subscriber TB), and offers the incoming call request to TB using conventional signalling.

Furthermore, the resolution intelligence of the second connection broker 80, in response to receiving (in any order) both requests resolves out the two phantom terminals PTx and PTy, converting the two requests "Connect TA to PTx" and "Connect TB to PTy" into the single real connection request "Connect TA to TB". Specifically, the second connection broker 80 is able to deduce the fact that there is a common CIC for the phantom trunk, and so the requirement for a direct connection between TA and TB is identified by virtue of this commonality. The second connection broker 80 then makes an actual trunk connection between TA and TB via the second trunk network adaptor 56. At about the same time, the second connection broker 80 (of the second node 52) instructs the first connection broker 44 (of the first node 40) that the path to TB is in place.

Acceptance by the terminal TB of the call, and confirmation of the connection by the second call broker 80 is notified from the second call server 81 to the first call server 18, and the first connection broker 44 also notifies 116 its associated call server 18 that the path to TB is in place. At this point, the first call server 18 may start billing the call.

The phantom trunk remains intact for the whole duration of the call, with tear-down of the broadband connection operating in a complementary sense to the call set-up procedure describes in detail above. The skilled addressee will appreciate that to clear-down a broadband call, the call servers may clear a call using standard procedures for a narrowband (or SS-7) communication, as will readily be appreciated. Particularly, as part of this procedure, both call servers will issue requests to their respective connection brokers. Thereafter, the connection broker at the outgoing end of the phantom trunk will pass its release request onto the other connection broker by sending the CIC of the phantom trunk. The terminating connection broker will issue a clear-down of the broadband connection on receipt of whichever of the two messages it receives first. It is noted that the phantom trunk is not re-useable until both call servers have been told (by their respective connection brokers) that the broadband connection has cleared.

As will be understood, an exemplary address format for each phantom terminal is typically arranged to be a special case of the format used for real (i.e. physical rather than imaginary) terminals. An ASN.1 Object Identifier can be used to identify phantom trunks. Alternatively, a partitioned E.164 address or a superset of E.164 may be utilised, while for a simple SS7-based implementation the tuple (OPC, DPC, CIC) can uniquely identify a trunk (whether real or phantom). However, as will be appreciated, another scheme is needed for non-SS7 terminals, such as telephones. For example, the CIC field could be extended to 32 bits (rather than the normal 16 bits) and DPC can then be equated to OPC to identify a "line" type of a terminal while the CIC can be used to identify the line on the exchange. Generally, however, the only requirement for establishing a phantom trunk is for the connection broker to appropriately tag and record (in the terminal number data base 69) such a phantom trunk as either incoming or outgoing.

Turning again to the general architecture of FIG. 2, an ATM network and the International Telecommunications Union, Telecommunications Section (ITU-T) signalling system No. 7 an be utilised to implement the broadband network and narrowband control signalling, respectively.

Particularly, a narrowband node utilises the ISDN User Part (ISUP) of ITU-T signalling system no. 7 to communicate with other exchanges (e.g. narrowband network 52) to support multi-node operation. The exchange terminates some narrowband lines directly and terminates narrowband trunks via trunk network adaptor 46 connected to an Asynchronous Transfer Mode (ATM) network 48. The trunk network adaptor 46 translates bearer channels to an ATM scheme, with a one-to-one relationship existing between each bearer channel and an ATM virtual channel (VC). Typically, the broadband network edge switches 50, 60–62 and hence the trunk network adaptors 46, 56–58 are connected to the ATM network 48 using ATM Forum User to Network Interface (UNI) version 4.0 interfaces for the traffic bearer channels and the control lines 51, while the connection brokers establish Q.2931 connections 51 to trunk network adaptors 46, 56–58 using the proxy signalling option of UNI 4.0.

Narrowband signalling to other exchanges can use either existing narrowband connections or can be routed via network adaptors (e.g. 46, 58) and the broadband network using either circuit emulation or frame forwarding. The concept is applicable to both fully and quasi-associated signalling schemes. Connections to another mixed mode node are implemented in a similar fashion.

As will now be understood, the connection broker 44 passes narrowband-tonarrowband requests to the narrowband switching fabric 16, while broadband-to-broadband connections (within the same node) are established using proxy signalling to set-up the connection directly. For narrowband-to-broadband connections, two requests are needed; one to the narrowband switching fabric 16 and one to the broadband network edge switches 50, 60–62. However, for a broadband-to-phantom terminal connection, the connection broker passes the connection request to the second connection broker (reference numeral 80 of FIG. 4) at the other end of the phantom route. The connection is then made by using a proxy signalling scheme emanating from the second connection broker 80. It should be noted that the present invention envisages that the phantom terminals are implemented as broadband terminals, and so a narrowband-to-phantom terminal connection is handled as a combination of a narrowband-to-broadband connection and a broadband-to-phantom terminal connection.

It will also be appreciated that the service inter-working function is also applicable to networks that have intermediately coupled broadband networks. In this instance, the interconnection between call servers can provide gateway functions, such as billing and screening, while the connection brokers permit end-to-end connections between the narrowband terminals. Similarly, signalling inter-working functions not otherwise available to respective narrowband networks can be provided by connecting call servers together via the phantom trunks.

In summary, the second connection broker recognises two connection requests have been received to the opposite ends of the same phantom trunk, and in response thereto establishes a direct route through the broadband network between the first subscriber terminal 12 and the second subscriber terminal 68.

The connection mechanism outlined above therefore provides for the interconnection of mixed nodes through an intermediate broadband network which is otherwise unable to interpret and therefore unable to support the control channel signalling protocols separately utilised within the narrowband networks. Such operation could be supported, for example, by a modified trunk network adaptor (of a broadband network) equipped with narrowband signalling software, but generally occurs between different infrastructure exchanges. Consequently, by employing this mechanism to establish a common control channel, the modified trunk network adaptor can support a narrowband traffic resource to participate in narrowband services without requiring the intervention of a signalling inter-working function.

Beneficially, the combination of phantom trunks and the connection broker architecture results in a system implementation that requires no modifications to present narrowband signalling schemes and which supports all narrowband services. Additionally, only minimal changes are required to existing narrowband call servers. Indeed, this system is scaleable to arbitrarily complex networks and which can operate over any underlying connection fabric including TDM, ATM or Frame Relay.

The basic architecture shown in FIGS. 2 to 4 illustrates the configuration (and describes the function) of the principal equipment that utilises the novel and inventive concept of phantom trunks to establish effectively a connection between narrowband trunks and virtual circuits of a broadband network. However, for a better understanding of the structure of a broadband-narrowband interface (such as an asynchronous transmission mode system, termed an "ATMS") and its associated management system, reference is now made to FIG. 5.

Figure 5:
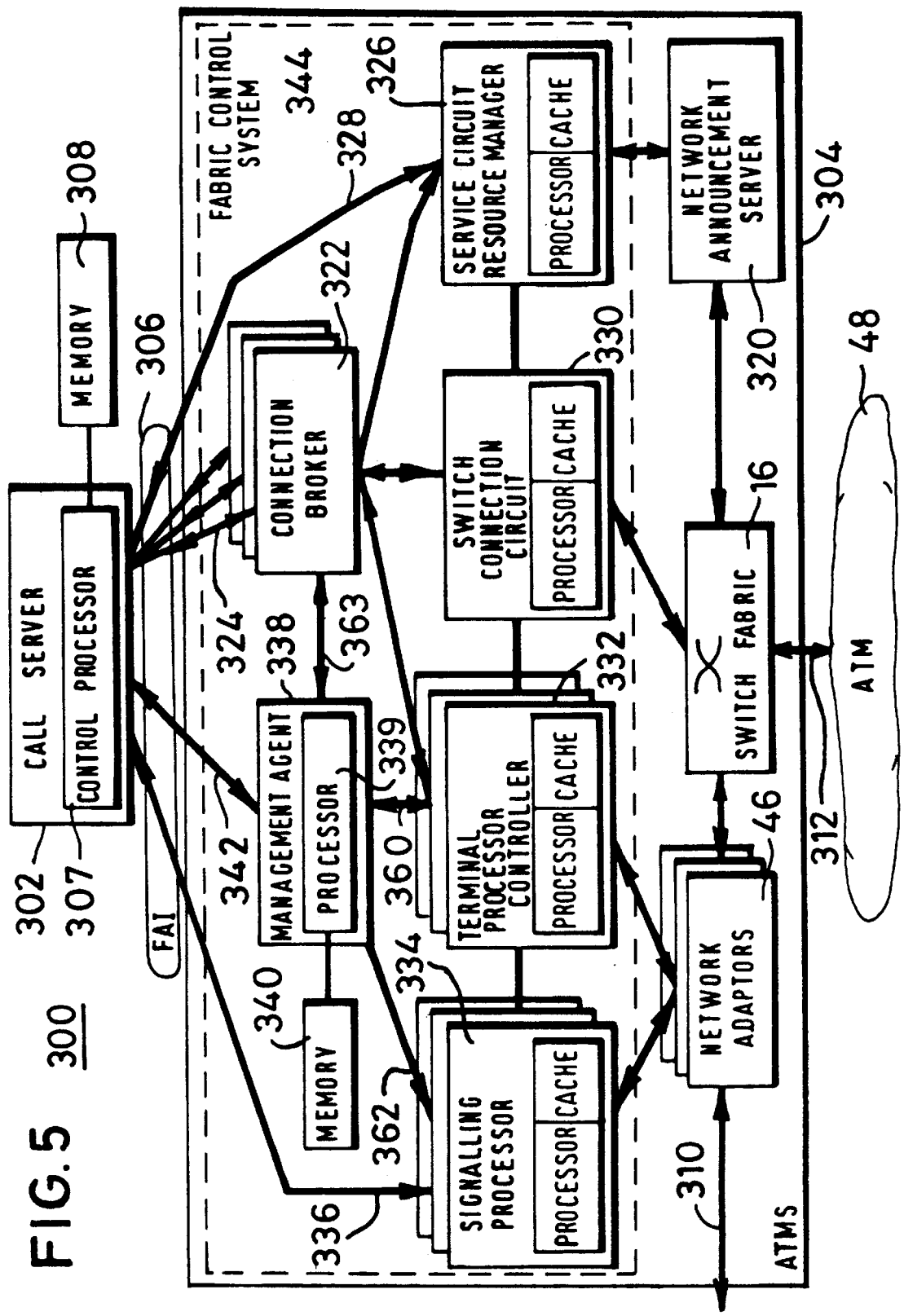
FIG. 5 is a hardware block diagram of a broadband-narrowband interface used in the present invention.

Considering in detail the block diagram of FIG. 5, a call server 302 controls the operation of a narrowbandbroadband interface (ATMS) 304 through a fabric application interface (FAI) 306, which FAI preferably provides a simple and uniform view between the call server and the narrowband-broadband interface. The call server 302 contains a control processor 307 that interacts with a memory 308 that serves to store system control algorithms, network addresses and information relating to communication connections and the operational status of the network, generally. The memory 308, although shown as a separate entity from the call server, may be located within the call server itself.

As will be appreciated, the ATMS 304 provides an interface for connecting narrowband trunks, typically supporting a time division multiplexed protocol (although other forms of multiplexing are also applicable), to virtual circuits 312 used to relay information across a broadband network 48 (such as an ATM network). The ATMS 304 supports many narrowband trunks 310 and contains many network adaptors 46. A switch fabric 16 acts to connect network adaptors 46 (and hence information or data incident to narrowband trunks) to virtual circuits 312. The switch fabric 16 is further coupled to a network announcement server 320 that typically stores a plurality of prerecorded system announcements that provide verbal instructions or verbal reassurance to narrowband or broadband users attempting to utilise the narrowband-broadband interface. For example, the network announcement server 320 may store and relate the message "All connection in the network are presently busy, please try again later" when no virtual circuits 312 are available for connection into the ATMS 304, or no trunk circuits 310 are available for through-connection to the narrowband network.

The ATMS 304 typically includes many connection brokers 322 that are connected to the call server 302 through the fabric application interface 306, although the ATMS must contain at least one connection broker for successful operation. More specifically, interconnection of the call server 302 to the connection brokers 322 is achieved through a fabric control interface (FCI) 324 that can support and relay, amongst other things, virtual channel identities and system control messages. In more detail, the connection broker 322 is responsible both for overseeing interactions between the ATMS 304 and the call server 302 concerning connections through the ATMS 304 and for coordinating other fabric control modules to implement and satisfy call server instructions and requests. In other words, the call server 302, as previously indicated, is principally responsible for controlling the making and breaking of connections across the narrowband-broadband interface.

Fabric control modules that connect to the connection broker 322 include a service circuit resource manager 326 that is responsible for managing a pool of network announcement servers 320 that may need to be connected to traffic connections across the ATMS, as previously described. The service circuit resource manager 326 is also coupled through the fabric application interface 306 to the call server 302, which connection to the call server is through a dedicated announcement control interface (ACI) 328.

A switch connection circuit 330, coupled between the connection broker 322 and the switch fabric 16, is responsible for coupling and detaching virtual circuits 312 that terminate on the switch fabric 16. In other words, the switch connection circuit 330 controls through connection (i.e. circuit switching) of virtual circuits 312 to identified network adaptors 46.

Terminal process controllers 332 (of which there are usually many within the ATMS 304) are positioned and connected between the connection broker 322 and the plurality of network adaptors 46 within the ATMS 304. Each terminal process controller 332 is responsible for managing the operation of synchronous circuits terminating on a network adaptor 46 in traffic connections across the ATMS, and hence serves an analogous purpose to the switch connection circuit 330 but in relation to narrowband trunks (rather than virtual circuits). The terminal processing controllers 332 are also coupled to signalling processors 334 (of which there are typically many within the ATMS 304), while the signalling processors 334 are also coupled to the network adaptors 46. Each signalling processor is coupled to the call server 302 through a signalling control interface (SCI) 336 that forms part of the fabric application interface 306. The function of each signalling processor 334 is to control the conversion of signalling information between FAI messages exchanged over the SCI 336 between the call server 302 and the framed structures and signalling formats used by the synchronous circuits that terminate on each network adaptor 46. In other words, each signalling processor acts to convert information bits at a network adaptor level to and from messages at a call server level. In this way, a unified view is provided by a fabric application interface 306 by virtue of the use of standard signalling schemes on the FCI 324, the ACI 328 and the SCI 336.

The system also includes a management agent 338 having a control processor 339 and associated memory 340. The associated memory 340, although shown external to the management agent 338, may be located within the management agent 338. The management agent is also coupled to the call server 302 through the fabric application interface (FAI) 306. Specifically, a dedicated management virtual channel circuit (VCC) 342 provides interconnection of the call server 302 to the management agent 338, with the management VCC 342 also forming part of the fabric application interface 306. The management agent 338 is also coupled to each of the terminal process controllers 332 and each of the signalling processors through information buses 360–362, while the management agent 338 is also able to communicate (over another information bus 363) with the connection broker 322.

The connection broker 322, the service circuit resource manager 326, the switch connection circuit 330, the terminal process controllers 332, the signalling processors 334 and the management agent 338 (and its associated processor 339 and memory 340) together contain and constitute a distributed fabric control system (FCS) 344. The FCS 344 therefore also contains software programmed blocks that control the functionality of the ATMS 304 and its interconnection to the call server 302 through the FAI 306. The signalling processors 334, the terminal process controllers 332, the switch connection circuit 330 and the service circuit resource manager 326 will therefore each typically require dedicated processors and memory (perhaps realised as an on-chip memory cache, as shown in FIG. 5). The processors will control operation of the individual instances, and may be accessed (or interrogated) by the management agent 338 to access operational status, for example.

The fabric control system 344 can have a distributed functionality, with the fabric control system 344 comprising five principal functional modules and a management agent 338. It will, however, be appreciated that the distributed functionality provided by the functional modules may be collocated since the functionality is typically realised by controlled software located within system controllers or processors.

It will be understood that dedicated information buses may also be provided between the management agent and both the switch connection circuit 330 and the service circuit resource manager 326, notwithstanding that the management agent 338 is able to communicate with (and interrogate) these units through the connection broker 322. Additionally, such information buses may only be required for a distributed system in which the fabric control system 344 is realised by discrete functional units.

In relation to the management agent 338, this represents an additional and supplemental management interface between the call server 302 and the fabric control system 344, which management agent 338 and its associated management VCC 342 serves to enhance the FAI 306 by establishing contextual information for the ACI 328, FCI 324 and the SCI 336. The management agent 338 also serves to advise and relay information relating to the interchange of non call-related status information, e.g. the operational status of trunk circuits.

With regard to the management VCC 342, this virtual circuit is well known to the call server 302 and the management agent 338. Indeed, both the call server 302 and the management agent 338 have knowledge of the existence and the virtual channel identity number of the management VCC in advance of the narrowband-broadband interface going on-line. As such, the call server is always able to communicate with the management agent 338, with both the management agent 338 and the call server always being aware of the existence of the other unit.

The associated memory 340 of the management agent 338 is principally loaded (and can be up-dated) with system (or network) configuration information pertaining to the types of interfaces used in the fabric application interface 306, the addresses of virtual circuits used for these interfaces and the number and type of fabric control models used within the fabric control system 344. Moreover, the associated memory 340 contains information concerning the number of connection broker instances, for example, as well as the numbers of signalling processors 334. Generally, therefore, the call server 302 is unaware of the internal details (i.e. the structure) of the fabric control system 344. The call server 302 only knows that it has access to a number of pre-defined interfaces provided as a uniform view presented by the fabric application interface 306, while the management agent 338 controls the set-up of the fabric application interface 306 within a particular ATMS 304 by providing detailed system configuration information to the call server, namely port address information, virtual circuit information, and the types and numbers of functional modules within the FCS 344.

After establishment of the configuration of the FAI 306 through notification of available instances and addresses, the call server 302 can request status information on the management VCC 342. The fabric control system 344 is then able to respond to this request (through the management agent 338) on the management VCC. Alternatively, the management agent 338 can provide autonomous event information to the call server 302 over the management VCC 342, while the connection broker can also provide information (such as circuit connection verification) to the call server directly or via the management agent. For example, the management agent 338 can utilise the management VCC 342 to notify the call server of significant operational changes with respect to: i) an operational status of a particular connection broker or signalling processor; ii) the operational status of lower-tier equipment, e.g. in relation to circuits within the service circuit resource manager (reported via the connection broker); or iii) the number, present use or availability of trunk circuits. In all these respects, a preferred embodiment of the present invention uses a Q.2931-based signalling scheme to support this data transfer, with the principal messages of relevance being "STATUS ENQUIRY", "STATUS"and "NOTIFY"primitives and the use of F-5 cells (defined in ITU-T standard I.610 as operation and maintenance specific). Clearly, other signalling protocols could also be used across the FAI 324, with the selection merely dependent upon the operational requirements of the call server (as will be appreciated by the skilled addressee).

In relation to a STATUS ENQUIRY, this form of enquiry can be instigated from either end of the management VCC 342. More particularly, a STATUS ENQUIRY solicits an absolute response through a STATUS response message, with the STAUS ENQUIRY message containing, in this context, a modified frame structure. Whereas a STATUS ENQUIRY would usually contain a call reference field, this call reference is superfluous to a request concerning system configuration and, as such, the field can be used, for example, to identify particular network or ATMS elements of interest or a response type. Similarly, the STATUS response message does not need to contain a call reference field, and so this unused field can, in the context of the present invention, be used for a different purpose, e.g. to provide response information and cause of failure information. In other words, the STATUS ENQUIRY expressly identifies the circuit of functional element of interest, while the STATUS response message provides a report by using data fields that have no meaning in relation to system configuration and system operation. With regard to the NOTIFY primitive of the Q.2931 protocol, NOTIFY is an unsolicited message that usually includes a call reference and a notification indicator of length five bytes. Again, in the context of system-wide reports on configuration and operational status, call reference fields can be temporarily commandeered (or appropriated) to report system changes or addresses, while the format of the notification indicator can be structured to identify, for example, cause of failure.

Generally, as will now be understood, the connection broker can react to status enquiries issued by the call server provided that its signalling protocol can support call server interaction and interrogation. In fact, all functional blocks within the FCS 344 can report system events to the call server, but such reports are limited to the scope of responsibility of each functional block, e.g. the status of a single circuit. However, the management agent 338 has the capability to support all management operations of the FCS 344, and therefore is able to report on the functional status of the individual functional blocks themselves. Use of the management agent 338 for all such system reports is considered preferable, although this mechanism is slower because it required a STATUS ENQUIRY, for example, to be relayed through the management agent rather than directly to the functional block of interest. The management agent 338 therefore generally responds to requests and system status, but can also be used as a vehicle for issuing a change in an individual circuit, e.g. the call server instructs the management agent to issue a command to network adaptor, for example.

The management agent may store system information pertaining to system configuration in its associated memory 340, which information may trigger periodic polling of a failed system entity, e.g. a broken connection broker or a broken trunk.

Figure 6:
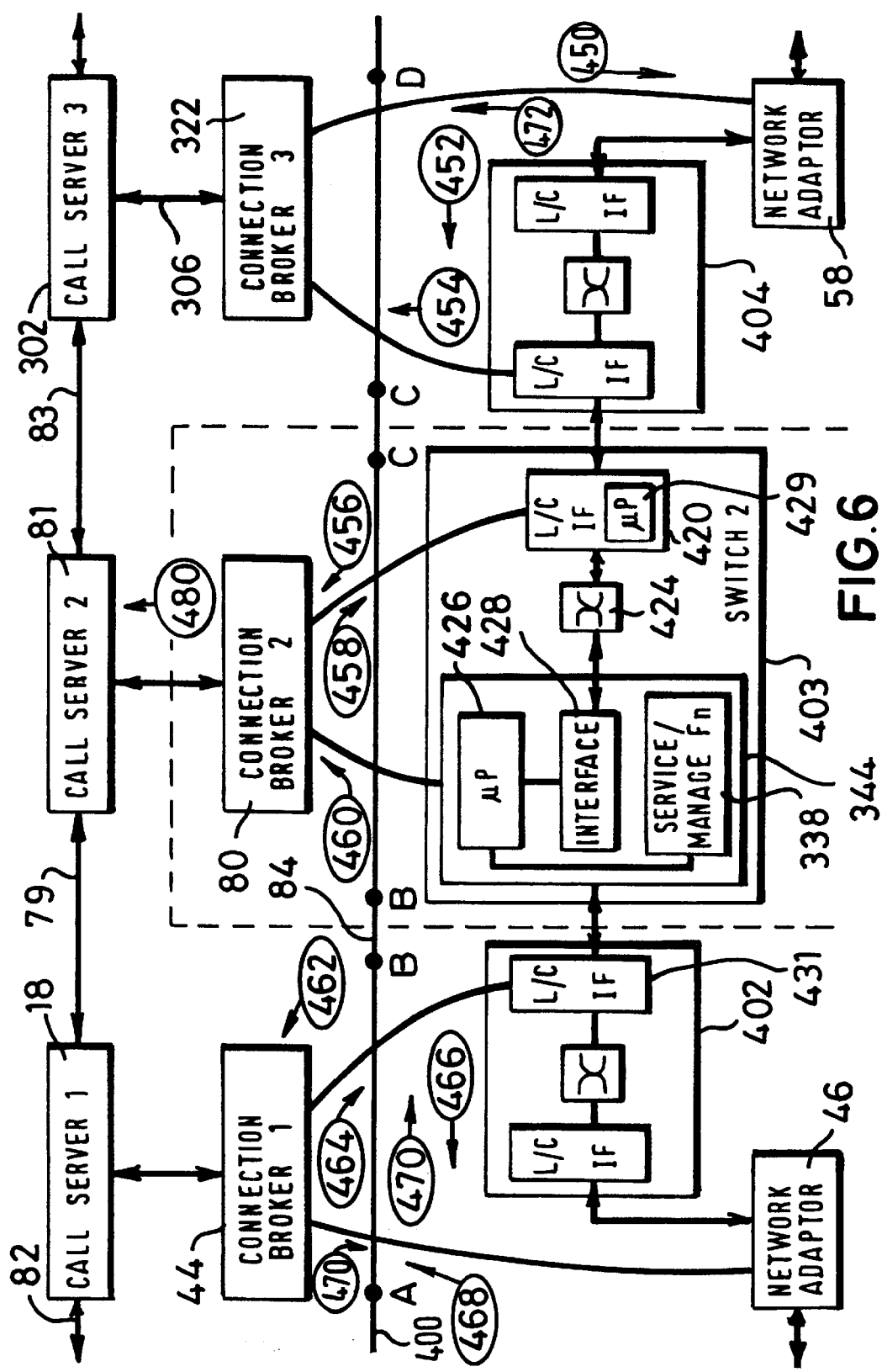
FIG. 6 depicts a network and signalling scheme in which an end-to-end connection has been established and verified in accordance with a preferred architecture and operating mechanism of the present invention.

FIG. 6 depicts a network and signalling scheme in which an end-to-end connection (A←→D) 400 has been established and verified in accordance with a preferred architecture and operating mechanism of the present invention. More particularly, FIG. 6 depicts (for exemplary purposes) an ATM Network in which the connection 400 has been established through three adjacent ATM switch assemblies 402–404. FIG. 6 further illustrates a message flow for the process that verifies that the connection 400 has been set up between point A and point D. As will now be readily appreciated, the connection between point A and point D would have been specified (and controlled) by interactions between the interconnected call servers 18, 81 and 302 (and their respective connection brokers 44, 80 and 322).

Before discussing the verification mechanism, the network of FIG. 6 basically comprises three interconnected ATM systems; each ATMS typically having a connection broker, a switch fabric matrix and control system and a narrowband network adaptor interface, where appropriate. More particularly, with reference to ATM switch assembly 403, each switch assembly contains a fabric control system 344 and interconnected network adaptors (and/or line card interfaces 420) and switch fabrics 424 (generally structured in accordance with FIG. 5 and as will be readily appreciated). With specific regard to the fabric control system 344, a control processor 426 administers operational control of an interconnected interface 428.

The connection broker 80 associated with the middle ATM switch assembly 403 has been shown separate to the fabric control system 344, this separation merely aids clarity of the drawing and allows for a signal flow to be annotated on FIG. 6 to render the figure more easily understandable. Clearly, therefore, the separate function blocks may be realised in a single unit, although a modular system is envisaged and may be desirable.

Turning now to the connection verification mechanism and signalling scheme, the connection 400 has been set up in three stages, namely: i) point A to point B through the first ATM switch assembly 402; ii) point B to point C through the second (in this case the middle) ATM switch assembly 403; and, finally, iii) point C to point D through the final ATM switch assembly 404. Point A and point D are, in this exemplary figure, shown to be located in different narrowband networks (and hence beyond respective network adaptors 46 and 58). The connection 400 has been established using the above described phantom trunk methodology. ATM cell flows have also been enabled in both directions.

As previously described, trunk identifiers A, B, C and D are identified by assigning NSAP Identifiers which can then be used by the call servers 18, 81 and 302 to request connections in the broadband fabric. More specifically, a trunk identifier is a common identifier used by both the call server and the connection broker, with a preferred embodiment of the present invention using a trunk identifier with an NSAP format (which is one of the options for terminal identifiers used in Q.2931). Operationally, each call server contains a table that relates signalling scheme No. 7 (OPC, DPC, CIC) to NSAPs, while each connection broker has a table that relates (i.e. maps) NSAPs to whatever proprietary identification is used with the network adaptor or phantom trunk memory locations.

Basically, in accordance with the underlying inventive concept of the present invention, the ATMS 304 provides a means of multiplexing and sending messages on to the same traffic path as the virtual circuit, with these messages carried either section-by-section or on an end-to-end with respect to the virtual circuit and without these messages interfering with the traffic cells. More specifically, the present invention utilises in-band ATM operation and maintenance (OAM) cells, e.g. F-5 cells, in a new environment to verify connection across one or more sections (i.e. one or a plurality of interconnected ATM systems). The content, structure and use of F-5 cells in relation to system operation and maintenance purposes is defined in ITU standard I.610. In fact, by using the preferred messaging sequence shown in FIG. 6, the present invention provides an application of F-5 cells to verify that the virtual circuit established for a call was the actual virtual circuit intended and set-up by management interaction within or between, respectively, one or more call servers. Additionally, the preferred messaging sequence provides a mechanism for achieving path-trace and/or path integrity for the virtual circuit.

Looking again to FIG. 6 in which F-5 cell messaging sequence is constructed from a number of individual messages (represented by arrow-orientated discs) sent to and from, and interpreted by, individual connection brokers in interconnected ATM systems.

The messaging sequence of the verification mechanism of the preferred embodiment of the present invention operates by having the connection broker 322 at the terminating end of the call (i.e. the connection broker associated with the final ATMS of the connection path as determined, for example, by operation of a network adaptor) send a "verify-request between D and C on a section-by-section basis" message 450 to a network node, e.g. network adaptor 58. The verify-request message 450, contained in an F-5 cell, initiates a backwards trace towards the network adaptor 46 into which an incident call set-up request was sent by a subscriber terminal, for example.

Co-operation, as necessary, between signalling processors 334 and terminal processor controllers 332 associated with the network adaptor 58 ensures that the F-5 cell (containing the "verify-request between D and C on a section-by-section" message 450) is communicated across the final ATM switch assembly 404 as another F-5 cell message 452. Upon receipt of the F-5 cell message 452, the ATM switch line interface card of the final switch assembly 404 responds by sending a "verify-confirm (D-C received on C)" message 454 to the commonly connected connection broker 322. As such, the local connection path D-C (and its integrity) between the network adaptor 58 and an output interface of the final ATM switch assembly 404 is confirmed at the connection broker 322.

Since the ATM switch line card is also coupled directly to a transport link that supports communication, the F-5 cell message should also now be available to an ATM switch line card 420 located within the middle ATM switch assembly 403. In response to receipt of the F-5 cell (containing the original instruction "verify-request between D and C on a section-by-section basis"), microprocessor-based controllers 429 that are associated with the line card interfaces 420 of the middle ATM switch assembly 403 cause a "verify-confirm (D-C received on C)" message 456 to the local connection broker 80.

In response to receipt of the "verify-confirm (D-C received on C)" message 456, connection broker 80 determines (from the information contained in the F-5 cell message) that local connection C-B (across the middle ATM switch assembly 403) needs to be verified. Consequently, the connection broker 80 sends a "verify-request (D-C-B) (Section-by-section)" message 458 back to the ATM switch line card 420.

Basically, upon passing through the switch fabric 424, the verify-request (D-C-B)(Section-by-section)" message 458 causes the control processor 426 of the middle ATM switch assembly 403 to send another message "verify-confirm (D-C-B received on B)" message 460 to the local connection broker 80; this verifies the path and integrity of the local connection C-B to connection broker 80.

Again, in a similar fashion to that already described, the ATM switch line card (from which the verify-confirm (D-C-B received on B)" message 460 emanates) acts as an output and is coupled directly to a transport link that supports communication. Consequently, the F-5 cell message "verify-request between D-C-B on a section-by-section basis") should now also be available (through a propagation process) to an ATM switch line card 420 located within the first ATM switch assembly 402. In response to receipt of the F-5 cell, microprocessor-based controllers (not shown but which are identical in fashion to controller 429) that are associated with the line card interfaces 431 of the first ATM switch assembly 402 cause a "verify-confirm (D-C-B received on B)" message 462 to be sent to the local connection broker 44.

In response to receipt of the "verify-confirm (D-C-B received on B)" message 462, connection broker 44 determines (from the information contained in the F-5 cell message) that local connection B-A (across the first ATM switch assembly 402) needs to be verified. Consequently, the connection broker 44 sends a "verify-request (D-C-B-A) (Section-by-section)" message 464 back to the ATM switch line card that is incident to the F-5 cell. The "verify-request (D-C-B-A)(Section-by-section)" message 464 is further arranged to propagate across the switch fabric (of the first ATM switch assembly 402 and as realised by message 466) towards the originating TDM network adaptor 46.

As will be appreciated, the term "originating" is used in the sense that the node (i.e. the network adaptor 46) is the first point at which a narrowband trunk interfaces with a narrowband-broadband interface. Also, in relation to every line card interface, for example, and while not explicitly shown for the reasons of clarity, it will be appreciated that such circuit-related equipment includes control processors or microcomputers that function to maintain operational control.

When the "verify-request (D-C-B-A)(Section-by-section)" message 466 is received at the originating TDM network adaptor 46, the TDM network adaptor 46 can then send a message "verify confirm (D-C-B-A received on A)" 468 to the associated connection broker 44. The "verify confirm (D-C-B-A received on A)" message 468 therefore indicates that the requested path A-D has been established across the entire broadband network. Subsequently, the connection broker 44 can respond by sending a "verify confirm (D-C-B-A received on A)(End-to-end)" message 470 to complete the verification sequence. Indeed, the "verify confirm" message 470 is typically sent in-channel over virtual link 400 (in FIG. 6) or via interconnected call servers. Once the verify confirm message 470 has been received by the signalling processor and/or the terminal processor associated with the final ATM switch assembly 404 and end network adaptor 58, then a "verification successful" message 472 can be relayed to the connection broker 322 (which can then record a successful verification and also note the path trace information D-C-B-A, if that is the purpose of the verification function).

The purpose of the verify confirm message 470 (and the verify successful message 472) is to test a reverse path for the connection; clearly, by sending the verify confirm in-channel the separate paths of a bidirectional call can be independently verified. Indeed, the verify-confirm end-to-end also provides a continuity and quality test end-to-end.

In the event that a common traffic channel is assigned on a time division duplex (TDD) basis, the requirement to send the verify confirm message in-channel may be considered as superfluous. In this case, the originating connection broker (e.g. connection broker 322 of FIG. 6) need only be notified that the trace-back has been successful, with this notification provided over a dedicated signalling channel or, perhaps, via interconnected call servers.

The process of the present invention can be initiated on all or a selection of calls. Indeed, the process of the present invention can be used to audit the connection records of the call server and connection broker for long holding time calls, or it can be used as a network path trace function. More specifically, the present invention provides three principal operations, namely: a verification of connectivity (both in the sense of path trace and audit); an integrity and link quality verification on either an end-to-end or section-by-section basis; and an authentication mechanism through the use of digital signatures. In fact, the processes of the present invention provide means of achieving high integrity operation for the unbundled call server/connection fabric system.

The verification of connectivity confirms a path's connectivity in terms of "end" and "midpoints" to create a path trace or an audit (i.e. whether the path is still connected in the originally established manner), and also to distribute global knowledge of sectional connectivity that is otherwise known only locally and immediately after initial connection is established. Generally, each switch fabric within a path makes an autonomous decision with respect to how a local path is established and, in this respect, path connectivity is controlled at an ATMS level. However, details about the path ultimately provided by the linking together of each contiguous section of the ATM network must be made available to each connection broker, while each connection broker is initially only aware of its own internal cross-connections for the path. The in-band ATM OAM cells therefore act to relay connection information between connection brokers, with the connection information inherently contained within the sectional nature of the verify-request/confirm messages, for example. In other words, path connection information is appended to the in-band ATM OAM cell by each node in the trace-back. Consequently, after distribution of sectional connection information, any node at any point in the end-to-end path can actuate and effect complete path tear-down. Path trace and path audit can be executed on a periodic basis, as required.

In relation to the verification of both integrity and quality, the mechanism of the present invention is adaptable to determine and monitor the end-to-end (mainly) or section-by-section (secondarily) continuity of the connection with respect to the ATMS, and provides monitoring of connections. The term "quality" can generally be considered to be representative of quantitative measures for the connection, such as bit error rate (BER), while the term "integrity" is synonymous to path continuity and relates to what is connected and whether traffic is actually connected end-to-end or section-by-section. Put another way, connectivity may indicate (to the switch fabric, for example) that a path connection is made, whereas continuity (i.e. the ability to send coherent information) may be missing in the path. Every section of the connection is therefore configured to perform a continuity test since, in the asynchronous domain, continuity in the traditional sense does not exist and cannot be assessed. More explicitly, the flow of in-band OAM cells conveys a message having a content indicative of an aggregated measure of all traffic along the path to a particular point. Receipt of the in-band OAM cell and identificationlrealisation of the selected form of the OAM cell therefore inherently confirm path integrity, while check bits/words or predetermined sequences in the in-band OAM cell can assess quality of the connection path. Indeed, the function of F-5 cells is defined to provide both a qualitative measure of the integrity of the connection and an indication with respect to continuity. As will be appreciated, the F-5 cell causes the system to review the broadband (ATM) connectivity established through a plurality of contiguous nodes, with continuity providing a check (within each ATMS) against connection re-routing or re-establishment (actioned by the connection broker) that would otherwise disrupt the end-to-end path. Path integrity verification therefore guards against autonomous broadband (ATM) network transport failure or re-routing failure.

The process of connectivity verification is further amenable to the inclusion of digital signatures to ensure integrity of the ATMS network as a whole, and as will be understood. With the use of private and public keys, to sign and authenticate an in-band OAM cell, respectively, it is possible to secure the network to guard against malicious or erroneous interference (of the details contained in the connectivity verification procedure of the principal aspect of the present invention) by the ATM network on the ATMS. More particularly, the OAM cell contains connectivity information signed by the private key such that receipt of the OAM cell can only be validated if the signed information can be successfully decoded by the public key. Such digital signatures may be used to ensure accurate billing in a distributed ATMS network. The connectivity can be authenticated to a particular source, it is unforgeable, cannot be repudiated and can be arranged to be used once, it is unalterable by the receiver or by interception. Moreover, the message may be signed several times by each transit node and each transit point may thereby be authenicated. The art of digital signatures can be applied to the preferred embodiment as discussed in "Applied Cryptography, second edition" by Bruce Schneier and published by Wiley.

Clearly (and in a general sense), in the event that the connection broker is unable to verify a particular connection as having been established, then the connection broker can either report the fault directly to an interconnected (and typically its associated) call server (such as by providing a failure message 480), or can utilise the management agent to instruct the call server of the change in system operation. Indeed, the connection broker may report a fault both in relation to an internal connection across the ATM switch assembly or with respect to an adjacent and interconnected network adaptor or ATM switch assembly.

In summary, therefore, the architecture of the preferred embodiment of the present invention ensures that a connection made across a number of interconnected networks (including local networks), and particularly broadband networks, can be verified or traced, with these functions principally administered by connection brokers positioned intermediate between a call server and an ATM switch assembly. More particularly, modification of existing infrastructure circuitry only involves the insertion of appropriate programme code and instructions sets. Indeed, use of the inchannel F-5 cell to support the tracelverify function avoids the requirement for having a new instruction per se, since use of the F-5 cell in the context of path verification is novel. Generally, therefore, a control processor within the ATM switch assembly and connection broker are both responsive to the receipt of an F-5 cell containing a connection verification instruction (and an information string identifying a test segment of the path or the entire end-to-end path), while the control processor of the ATM switch assembly is operational to direct the verify instruction to its associated connection broker that then substantiates the existence (or failure) of a particular connection. Moreover, receipt of the F-5 cell (during or immediately following connection establishment, or in relation to a path-trace request or connection audit, for example) triggers the control processor of either the ATM switch assembly or network adaptor to send an appropriate message (or instruction) to the interconnected connection broker. The connection broker is then able to react to the message (or instruction) by checking the connectivity, integrity or quality of any stipulated connection.

The preferred mechanism of the present invention principally operates on the basis that the intermediately-positioned connection broker is aware that a verify-request message has been sent through its associated switch fabric infrastructure and, as such, is able to detect the presence of the verify-request message (or a functionally equivalent signal). The connection broker is then able to react accordingly by either confirming the path or by issuing a fault notice when it fails to detect, in a timely fashion, the verify-request message (or a functionally equivalent signal).

To identify a break in the connection between adjacent narrowbandbroadband interfaces, the connection brokers utilise a timing schedule for assessing connection integrity. The timing function can be based on clock cycles within the respective control processors of each connection broker, or a dedicated clock can be provided. More particularly, each connection broker has a timer for its internal verification, with the connection broker initiating the verification arranged to time the overall verification (or audit, etc.) function. In the event of a time-out (i.e. the failure of a function to execute within a predetermined time), the connection brokers can be interrogated in turn to provide a diagnostic function that identifies where the failure occurred. Indeed, for a connection failure between adjacent narrowband-broadband interfaces, the failure is identified by implication, since only one of the contiguous pair of narrowband-broadband interfaces will have initiated and potentially confirmed its internal connection integrity. In most cases of connection failure, a diagnostic would not be required and the residue paths would be cleared by sending a release message to the call server to initiate a normal release process.

As a general note, it will be appreciate that the verify-request message therefore principally acts to confirm path connectivity, but its purpose extends beyond merely confirming connectivity to an extent whereby the verify-request message includes sufficient information to assess continuity and quality of the path. In this respect, the term path "connectivity verify-request message" (or variations thereof) should be construed broadly and applied in a fashion appropriate to the context of the particular function being described.

It will, of course, be appreciated that the above description has been given by way of example only and that modification in detail may be made within the scope of the present invention. For example, although use of an F-5 cell entirely supports the mechanism of the present invention, a dedicated instruction could nevertheless be used to instigate the verification procedure. Additionally, the process could be implemented in a piecemeal fashion whereby each portion of the connection was verified before a successive part of the overall end-to-end connection was made, i.e. the connection was verified on a per connection broker basis before attempting an adjoining connection. Moreover, while the preferred embodiment of the present invention has been described in relation to F-5 cell and ATM virtual channel connections, it will be appreciated that the underlying inventive concept can be implemented using different message carriers, e.g. F-4 cells and ATM virtual path connections, or F-7 cells and ATM AAL-2 mini-channel connections. In addition, more elaborate schemes are contemplated within the scope of the present invention, e.g. a verify-request could be initiated at any point in a connection using the information available to a particular connection broker. For instance, the middle connection broker 80 (of FIG. 6) could initiate a verify-request C-B, which could lead to a verify confirm D-C-B-A being received in two parts from the connection brokers at each end of the connection, namely connection broker 44 and connection broker 322.

What is claimed is:

1. A method of verifying the path connectivity of a communication resource that supports a call between a first node and second node, the call established through a connection broker located intermediate between a call server responsible for controlling the call and a switch assembly that routes the call, and wherein the second node is separated from first node by at least one switch assembly, the method comprising the steps of:

causing the connection broker to be aware of a requirement to confirm the path connectivity of a connection between the first node and the second node;

sending, over the communication resource for the call, a path verify-request message between the first node and the second node;

detecting the path verify-request message at a respective node to which the path verify-request message was sent;

at the respective node to which the path verify-request message was sent, sending the connection broker a verify-confirm message indicating receipt of the path verify-request message over the communication resource for the call; and at the connection broker, receiving the verify-confirm message else causing the connection broker to register a fault in the communication resource for the call.

2. The method of verifying the path connectivity of a communication resource according to claim 1, wherein the second node is a network adaptor that interfaces a broadband resource to a narrowband trunk, and the step of causing the connection broker to be aware of the requirement to confirm further includes the steps of:

having the connection broker notify the network adaptor of the requirement to send the path verify-request message.

3. The method of verifying the path connectivity of a communication resource according to claim 1, further comprising the step of:

at the connection broker and in response to receiving the verify-confirm message, sending an end-to-end confirmation message to a connection broker associated with the node from which the path verify-request message originated, the end-to-end confirmation message verifying the path connectivity of the communication resource for the call.

4. The method of verifying the path connectivity of a communication resource according to claim 3, wherein the end-to-end confirmation message is sent in-channel.

5. The method of verifying the path connectivity of a communication resource according to claim 4, wherein the end-to-end confirmation message is sent within an operation and maintenance cell.

6. The method of verifying the path connectivity of a communication resource according to claim 5, wherein the operation and maintenance cell is an F-5 cell.

7. The method of verifying the path connectivity of a communication resource according to claim 1, wherein the path verify-request message is sent in-channel.

8. The method of verifying the path connectivity of a communication resource according to claim 1, wherein path verify-request message is sent within an F-5 cell.

9. The method of verifying the path connectivity of a communication resource according to claim 1, wherein the step of causing the connection broker to be aware of the requirement to confirm is triggered by a connection broker associated with a terminating node for the call.

10. The method of verifying the path connectivity of a communication resource according to claim 1, wherein the path verify-request message is sent in a backwards direction from the second node and towards a unit originating the call.

11. The method of verifying the path connectivity of a communication resource according to claim 1, wherein the step of causing the connection broker to be aware of the requirement to confirm further includes the steps of sending a verify-confirm message to the connection broker.

12. The method of verifying the path connectivity of a communication resource according to claim 3, further including the steps of:

at the connection broker associated the node from which the path verify-request message originated, waiting a predetermined time to receive the end-to-end confirmation message; and in the event of not receiving the end-to-end confirmation message within the predetermined time, sending a path disruption message to the call server.

13. The method of verifying the path connectivity of a communication resource according to claim 10, further including the step of providing a modified version of the path verify-request message as an output from the node to which the path verify-request message was sent.

14. The method of verifying the path connectivity of a communication resource according to claim 13, wherein the modified version includes node-specific connectivity information.

15. The method of verifying the path connectivity of a communication resource according to claim 3, wherein the end-o-end confirmation message is sent to the call server via a dedicated connection.

16. The method of verifying the path connectivity of a communication resource according to claim 1, wherein the step of detecting the path verify-request message further includes the step of using the path verify-request message to assess at least one of path integrity and path quality.

17. The method of verifying the path connectivity of a communication resource according to claim 5, wherein the operations and maintenance cell includes authentication codes.

18. The method of verifying the path connectivity of a communication resource according to claim 17, wherein the authentication includes a public key and a private key and wherein the method further includes the steps of:

decoding, by means of the public key, information signed by the private key;

ignoring the path verify-request message in the event that the step of decoding of the signed information is unsuccessful; and ignoring the path verify-request message in the event that the information has been tampered with.

19. A communication system comprising at least one call server responsible for controlling a call supported by a communication resource between a first node and a second node, a plurality of interconnected switch assemblies responsive to the at least one call server and arranged to provide routes for the communication resource, and a plurality of connection brokers each coupled between the at least one call server and each of the plurality of interconnected switch assemblies, the system further comprising:

means for causing a connection broker to be aware of a requirement to confirm the path connectivity of a connection between the first node and the second node;

means for sending, over the communication resource assigned to the call, a path verify-request message between the first node and the second node;

means for detecting the path verify-request message at a respective node to which the path verify-request message was sent;

in the respective node to which the path verify-request message was sent, means for sending the connection broker a verify-confirm message indicating receipt of the path verify-request message over the communication resource for the call; and in each connection broker, means for receiving the verify-confirm message to confirm path connectivity of the communication resource between the first node and the second node else means for causing the connection broker to register a fault in the communication resource assigned to the call.

20. The communication system of claim 19, further including means for determining at least one of a path integrity and a quality assessment, said means for determining operationally responsive to receipt of said path verify-request message.

21. The communication system of claim 19, wherein the second node is a network adaptor that interfaces a broadband resource to a narrowband trunk and wherein each connection broker contains means for notifying the network adaptor of the requirement to send the path verify-request message.

22. The communication system of claim 21, further means for sending an end-to-end confirmation message to a connection broker associated with the node from which the path verify-request message originated, the end-to-end confirmation message verifying at least the path connectivity of the communication resource for the call.

23. The communication system of claim 21, wherein the end-to-end confirmation message, the verify-request message and the verify-confirm message are sent within an operations and maintenance cell, and preferably within an F-5 cell.

24. The communication system of claim 19, wherein the path verify-request message is sent in a backwards direction from the second node to the first node and in a direction towards a subscriber unit originating the call.

25. The communication system of claim 21, wherein the network adaptor includes means for sending a verify-confirm message to the connection broker to make the connection broker aware of the requirement to confirm.

26. A connection broker for coupling between a call server and a switch assembly having a first node and a second node and wherein the call server is arranged to control a call supported by a communication resource established between the first node and the second node, the connection broker comprising:

means for receiving a path verify-request message emanating from the second node, which path verify-request causes the connection broker to anticipate receipt of a verify-confirm message sent from the first node;

means for registering a verify-confirm message to confirm at least path connectivity of the communication resource between the first node and the second node; and means for causing the connection broker to register a fault in the communication resource assigned to the call in the event that the means for registering fails to detect the verify-confirm message.

27. The connection broker of claim 26, further including means for notifying the second node of the requirement to send the path verify-request message.

28. The connection broker of claim 26, further including means for sending an end-to-end confirmation message.

29. The connection broker of claim 28, further comprising means for packaging the end-to-end confirmation message within an operations and maintenance cell, and preferably within an F-5 cell.

30. The connection broker of claim 28, further comprising means for receiving the end-to-end confirmation message and means, in response to the receipt of the end-to-end confirmation message, for substantiating path integrity of the communication resource to the call server.

* * * * *